United States Patent
Thomas et al.

(10) Patent No.: US 9,403,202 B2
(45) Date of Patent: Aug. 2, 2016

(54) METHOD FOR LUBRICATING INTERIOR OF HEAT EXCHANGER TUBE

(75) Inventors: Jason Michael Thomas, Avon, IN (US); Luis Felipe Avila, Manlius, NY (US); Jon P. Kennedy, Syracuse, NY (US); Loren D. Hoffman, Jamestown, IN (US); Jeffrey L. Jones, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 247 days.

(21) Appl. No.: 13/981,339

(22) PCT Filed: Jan. 20, 2012

(86) PCT No.: PCT/US2012/022013
§ 371 (c)(1),
(2), (4) Date: Jul. 24, 2013

(87) PCT Pub. No.: WO2012/102961
PCT Pub. Date: Aug. 2, 2012

(65) Prior Publication Data
US 2013/0306182 A1    Nov. 21, 2013

Related U.S. Application Data

(60) Provisional application No. 61/435,632, filed on Jan. 24, 2011.

(51) Int. Cl.
| | |
|---|---|
| *B21D 53/06* | (2006.01) |
| *B23P 15/26* | (2006.01) |
| *B05D 7/22* | (2006.01) |
| *B21D 39/08* | (2006.01) |

(52) U.S. Cl.
CPC ........ *B21D 39/08* (2013.01); *B05D 7/22* (2013.01); *B21D 53/06* (2013.01); *B23P 15/26* (2013.01)

(58) Field of Classification Search
None
See application file for complete search history.

(56) References Cited

U.S. PATENT DOCUMENTS 6,200,632 B1 * 3/2001 Leendertsen ................ 427/230
9,078,505 B2 * 7/2015 Skrzypchak ............. A45D 8/14

\* cited by examiner

*Primary Examiner* — William Phillip Fletcher, III
(74) *Attorney, Agent, or Firm* — Cantor Colburn LLP

(57) ABSTRACT

A method of lubricating an interior of a tube includes applying a lubricant including a mixture of an additive and a solvent into an interior of a tube. A flow of drying agent is injected into a first end of the tube to force the solvent from the interior of the tube via a second end of the tube thereby leaving a coating of additive at the interior of the tube. The drying agent is heated to remove additional solvent from the interior of the tube via evaporation.

10 Claims, 1 Drawing Sheet

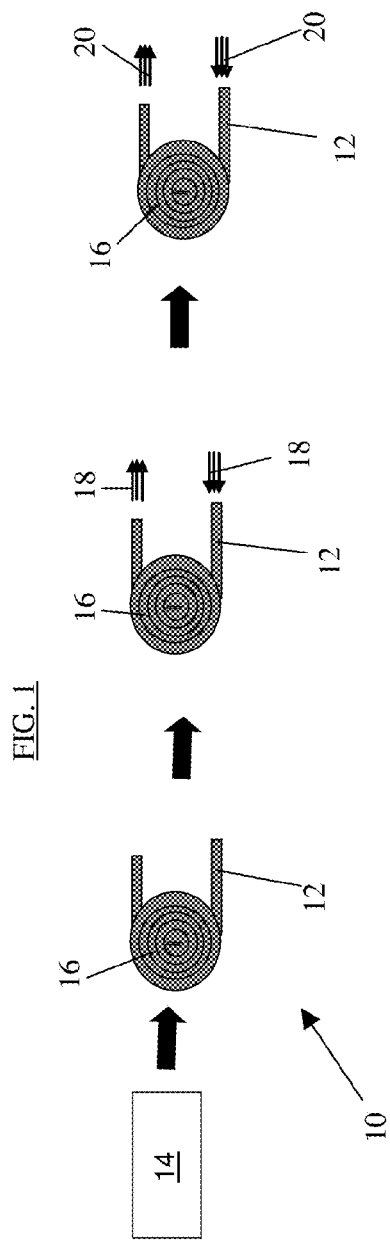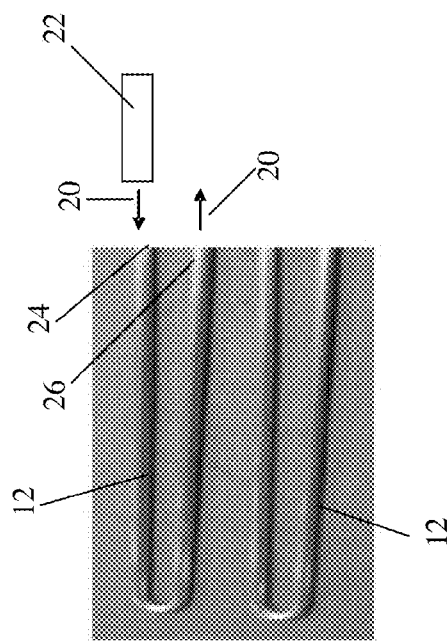

METHOD FOR LUBRICATING INTERIOR OF HEAT EXCHANGER TUBE

BACKGROUND OF THE INVENTION

The subject matter disclosed herein relates to heat exchanger tubes. More specifically, the subject disclosure relates to a lubricant drying system for expansion of heat exchanger hairpin tubes.

Heat exchangers of, for example, air conditioners, include a plurality of heat exchanger fins and a plurality of heat exchanger tubes. The tubes are passed through holes in the fins, then are expanded to force the tubes into interference fit with the fins, thereby securing the tubes in place relative to the fins. The tubes include hairpin bend portions which are formed from straight tubes by bending, and then are expanded. Typically, the hairpin tubes are coated in lubricant prior to expansion, to prevent buildup of tube material (typically aluminum) on the expansion tooling, and also to reduce a force needed to expand the tube using the expansion tooling. The lubricant utilized, such as a dry-lubricant, is applied to the tubes wet, with the aid of a solvent. For optimal lubricant performance, and to achieve proper expansion, the solvent must be dried out of the tube prior to expansion of the tube to reduce variability, and resulting defects, during the expansion process.

BRIEF DESCRIPTION OF THE INVENTION

According to one aspect of the invention, a method of lubricating an interior of a tube includes applying a lubricant including a mixture of an additive and a solvent into an interior of a tube. A flow of drying agent is injected into a first end of the tube to force the solvent from the interior of the tube via a second end of the tube thereby leaving a coating of additive at the interior of the tube. The drying agent is heated to remove additional solvent from the interior of the tube via evaporation.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic diagram of a process of forming tubes for a heat exchanger; and FIG. 2 is a schematic of an embodiment of a hairpin bend tube for a heat exchanger.

The detailed description explains embodiments of the invention, together with advantages and features, by way of example with reference to the drawings.

DETAILED DESCRIPTION OF THE INVENTION

Shown in FIG. 1 is a schematic of a process 10 for forming tubes 12 for a heat exchanger. The tubes 12 formed via this process are formed of an aluminum material, but it is to be appreciated that other materials, such as copper materials, may be utilized.

Raw material 14, in this case aluminum, is formed into a tubular shape by, for example, extrusion, and rolled into a coil 16. A lubricant 18 including a desired amount of additive, coupled with a solvent which facilitates application of the lubricant, is circulated through the coil 16. In some embodiments, the lubricant is applied via a hose (not shown) which directs the lubricant into an interior of the coil 16. The lubricant, more specifically the additive, has the properties of high lubricity and low coefficient of friction, in some embodiments a coefficient of friction less than 0.10. In some embodiments, the coefficient of friction is between about 0.05 and 0.08. In some embodiments, the ratio of additive to solvent in the lubricant 18 is about nine parts solvent by weight to one part additive by weight. In some embodiments, the lubricant is one of Pre-Coat 456 or Pre-Coat 456e lubricant commercially available from Circle Prosco, Inc.

A flow of air 20 or other drying agent is injected into the tube 12 to remove the solvent from the lubricant 18 by forcing the solvent from the coil 16 due to the pressure of the injected drying agent. Removing the solvent from the lubricant 18 results in a coating of additive remaining on the interior of the coil 16. In some embodiments, the drying agent is injected into the tube for a predetermined length of time, for example, in the range of 5-7 minutes. In some embodiments, the time is about 5.5 minutes.

In some embodiments, heat is added to the drying agent to reduce the drying time by also removing at least a portion of the solvent via evaporation. In some embodiments, a temperature of the drying agent is in the range of about 200-220 degrees Fahrenheit. In this range, the lubricant 18 is reduced to about 10 percent of its initial weight, which corresponds to the weight of the additive remaining after the solvent, representing about 90 percent of the lubricant 18 weight is removed. Further, minimizing humidity of the drying agent decreases drying time.

The coil 16 is cut to produce a plurality of individual tubes 12 of one or more desired lengths. In some embodiments, the tubes 12 are formed into a hairpin shape as shown in FIG. 2. As a result of the forming process, additional solvent may be loosened from an interior of the tube 12, and an additional flow 20 of drying agent may be injected into the tube 12 to remove the solvent. This injection may be done utilizing one or more air knives 22 or other suitable mechanisms. The flow 20 of drying agent is injected into a first end 24 of the tube 12, so that the solvent may flow out from a second end 26 of the tube 12. Additionally, as with the previous injection of a flow 20 of drying agent, the flow 20 may be heated and/or the humidity reduced thereby further reducing a drying time of the tube 12.

Once a desired amount of solvent has been removed from the tube 12, the tube 12 is passed through fins (not shown) of the heat exchanger, then are expanded to force the tube 12 into interference fit with the fins, thereby securing the tube 12 in place relative to the fins. Because of the application of, and proper removal of the solvent from the mixture 18, the additive performance allows for a reduction in force required to sufficiently expand the tube 12 and reduces variability in the expansion process, and defects resulting from the variability.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for lubricating an interior of a heat exchanger tube, comprising:
   applying a lubricant including a mixture of an additive and a solvent onto an interior of the tube;
   injecting a first flow of a drying agent into a first end of the tube to force a first portion of the solvent from the interior of the tube via a second end of the tube;
   heating the flow of the drying agent to remove additional solvent from the interior of the tube via evaporation;
   forming the tube to a selected shape after injection of the first flow of the drying agent; and
   injecting a second flow of the drying agent into the tube to force a second portion of the solvent from the interior of the tube, thereby leaving a coating of the additive on the interior of the tube.

2. The method of claim 1, further comprising heating the flow of the drying agent to between about 200 and about 220 degrees Fahrenheit.

3. The method of claim 1, further comprising removing humidity from the flow of drying agent.

4. The method of claim 1, wherein the additive has a coefficient of friction of less than 0.1.

5. The method of claim 4, wherein the coefficient of friction is between about 0.05 and about 0.08.

6. The method of claim 1, wherein the lubricant is applied in a ratio of about nine parts solvent to about one part additive.

7. The method of claim 1, wherein the tube is formed from an aluminum material.

8. The method of claim 1, wherein the flow of drying agent is injected into the tube for between about 5 and about 7 minutes.

9. The method of claim 1, wherein the tube includes a bend of 180 degrees.

10. The method of claim 1, wherein the drying agent is air.

* * * * *